Synthetic Linear Polymer

Franklin T. Peters

Patented Jan. 6, 1942

2,268,616

UNITED STATES PATENT OFFICE 2,268,616

ARTICLE OF APPAREL

Franklin Traviss Peters, Wilmington, Del., assignor to E. I. du Pont de Nemours & Company, Wilmington, Del., a corporation of Delaware Application October 24, 1939, Serial No. 301,044

1 Claim. (Cl. 154—46)

This invention relates to articles of apparel and more particularly to stiff and semi-stiff articles of this kind.

Among the more successful of the various ways for manufacturing articles of the present kind it has been proposed to form collars from laminated cloth obtained by bonding together a plurality of plies of broadcloth through a stiffening layer of cellulose acetate which may be in the form of a mixed-weave fabric with cotton. These articles, however, tend to lose their stiffness and resiliency after repeated laundering. Resinous materials have also been used with some success as the bonding material or interlayer but since plasticizers must usually be used to obtain the required flexibility, undesirable changes take place through removal of the plasticizer in washing or by evaporation.

This invention has as an object a new and improved laminated cloth which is suitable for the manufacture of permanently stiffened collars and cuffs. A further object is the manufacture of articles of apparel such as collars and cuffs which are free from the above mentioned defects usually found in articles of this kind. Other objects will appear hereinafter.

These objects are accomplished by uniting two or more laminae, of suitable cloth, such as broadcloth, by means of a fiber-forming synthetic linear polymer.

The fiber-forming linear polymers used in the practice of this invention are the high molecular weight linear condensation polymers described in U. S. Patent 2,071,250 which are capable of being converted by suitable application of stress, referred to as cold drawing, into strong fibers showing by characteristic X-ray patterns orientation along the fiber axis. These polymers are obtainable from bifunctional reactants. Condensation polymers, as defined in J. Am. Chem. Soc. 51, 2559 (1929) are polymers the polymeric molecule of which can be converted by hydrolysis or its equivalent to a monomer which differs in composition from the structural unit by one $H_2O$ (or HCl, $NH_3$ etc.), or are polymers in which the polymeric molecule is formed from numbers of the monomers by a process of polyintermolecular condensation.

A representative class of the above polymers which are most useful in the practice of this invention are the polyamides particularly described in U. S. Patents 2,9071,253 and 2,130,948. The synthetic linear polyamides are of two types, namely, those derived from polymerizable monoaminomonocarboxylic acids or their amide-forming derivatives (ester, acid halide, anhydride, nitrile, amide, and lactam), and those derived from the reaction of suitable diamines with suitable dicarboxylic acids or amide-forming derivatives of dibasic carboxylic acids. On hydrolysis with mineral acids the polyamides revert to monomeric amide-forming reactants. For example, a polyamide derived from a diamine and a dibasic carboxylic acid yields on hydrolysis with hydrochloric acid the dibasic acid and the diamine hydrochloride. Similarly, a polyamide derived from an amino acid yields an amino acid hydrochloride on hydrolysis with hydrochloric acid.

The polyamides most useful as laminating agents are those having an intrinsic viscosity above 0.4, where intrinsic viscosity is defined as in the above mentioned U. S. Patent 2,130,948. In general, the strength and toughness of a polyamide increases with the intrinsic viscosity, polyamides having intrinsic viscosities between 0.6 and 2.0 being particularly useful.

Polyamides particularly applicable to this invention, because of relatively low melting points and solubility in a wide variety of solvents are the polyamide interpolymers derived from mixtures of polyamide-forming reactants, as for instance polyamide-polyesters derived from mixtures of diamines, glycols, and dibasic acids. For the lamination of fabrics and the preparation of stiffened collars, cuffs, etc., the interpolyamides are of especial value, possessing melting points in the appropriate range, namely from 100° to 200° C., together with high strength and an appropriate flexibility.

As an especially valuable interpolyamide there may be mentioned the interpolymer derived by polymerization of an equimolecular mixture of hexamethylene, diammonium adipate with decamethylene diammonium sebacate, and the interpolymer derived by interpolymerization of a mixture of hexamethylene diammonium adipate with omega-aminocaproic acid or its amide-forming derivatives, including caprolactam. These interpolymers may be prepared from readily available intermediates, and possess desirable physical properties. The laminated fabrics prepared with these interpolymers possess an especially appropriate degree of stiffness for use in collars, cuffs, etc. Furthermore, these interpolyamides melt at 150–175° C., and laminations of good anchorage without striking through and without fabric degradation can therefore be prepared. These interpolymers also possess good solubility in volatile solvents and are therefore readily adapted to the economical and commercially attractive process of solvent fusing, wherein the interlayer is moistened with a solvent for the polymer and subsequently bonded to the outer plies by pressing at a relatively low temperature. The addition of plasticizers to such interpolyamides is generally unnecessary but is occasionally desirable, as for example when a somewhat more flexible product is required for a special use, or when a product is desired that can be fused at relatively low temperatures without the use of solvents.

The stiffness of laminated collars, cuffs, etc., may be partially controlled by varying the degree of impregnation achieved during the fusing step or by changing the amount of polymer in the interliner. The strength of adhesion is sometimes improved by rapidly cooling the lamination after it has been formed, as by quenching it with water or other non-solvent.

In the accompanying drawing

Figure 1:
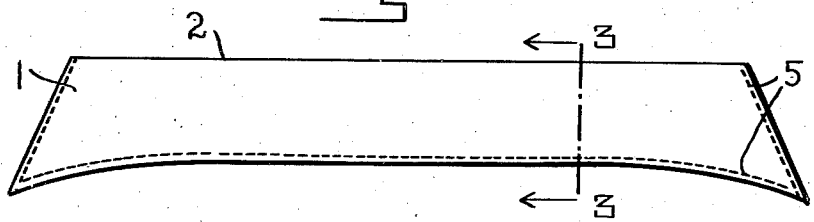
Fig. 1 is a plan view of a collar to which the present invention is applied.
Figure 2:
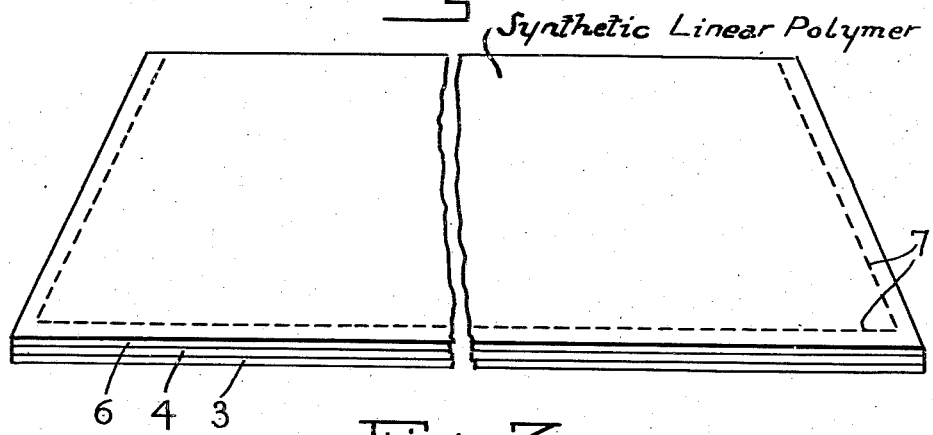
Fig. 2 is a view showing the separate plies from which the collar shown in Fig. 1 is made.
Figure 3:
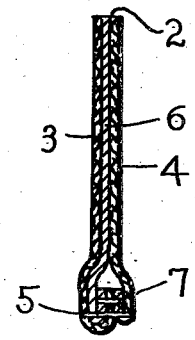
Fig. 3 is a section on the line 3—3 of Fig. 1.

The numeral 1 indicates the collar assembly which as shown in Fig. 3 comprises the inner and outer broadcloth plies 3 and 4 and synthetic linear polymer interliner 6. The collar is formed in the usual manner by cutting the suitably shaped blanks shown in Fig. 2 and arranging the synthetic linear polymer 6 on top of the two broadcloth plies 3 and 4. Stitching 7 is applied along three sides, and the assembly is turned inside out in such a manner that the synthetic linear polymer 6 is between the two broadcloth plies 3 and 4. A row of ornamental stitching 5 is applied on three sides, and the three plies are then subjected to the influences of heat and pressure to form a composite collar whereby the separate plies become integral. The unstitched side 2 is then inserted in the neckband (not shown) and is held in position by a row of stitching (not shown). Although the above illustration for simplicity has referred only to a 3-ply collar, it is to be understood that this invention is applicable to all the known forms of collars, cuffs, etc., in which the several plies of conventional collar fabric are joined through or by means of a stiffening interliner.

The following examples are illustrative of methods suitable for practicing my invention:

Example I

A film 0.002" thick of an interpolyamide of intrinsic viscosity of 0.85 derived by condensation polymerization from equimolecular parts of hexamethylene diammonium adipate and decamethylene diammonium sebacate is placed between two layers of cotton broadcloth, and the composition is then pressed between heated plates at 135° C. for 45 seconds under a pressure of 6000–8000 lbs./sq. in. The product shows very good adhesion, it being impossible to separate the outer layers from the polyamide interlayer without tearing the cloth. The polymer does not "strike through" the fabric. The product is of a stiffness appropriate for use as permanently stiffened collars, cuffs, shirt fronts, etc. The laminated fabric upon test showed that the plies do not separate after soaking in water at room temperature for 24 hours or boiled in an aqueous solution containing 0.25% soap and 0.1% sodium carbonate for 5 minutes.

Example II

Cotton muslin is coated and impregnated with a solution of 15 parts of an interpolyamide of intrinsic viscosity 0.85, derived by condensation polymerization from equimolecular parts of hexamethylene diammonium adipate and decamethylene diammonium sebacate, in 85 parts of a solvent consisting of 2 volumes of methanol mixed with one volume of trichlorethylene, the solution being used at 41° C. The coating is achieved by immersing the fabric in the solution, allowing it to drain at room temperature, and finally removing all traces of solvent by heating at 70° C. for 30 minutes. In this manner, 71 parts of polymer is coated on every 100 parts of fabric. The coated fabric is then placed between sheets of broadcloth, after moistening both the coated fabric and the sheets of broadcloth with n-butanol, and the composition is pressed under a medium hot hand iron for 5–8 seconds. The product has very good anchorage and a pliability desirable for semi-stiff collars. Anchorage is not affected by laundering for 15 minutes at the boil.

Example III

Cotton muslin fabric is coated with an aqueous colloidal suspension containing 8% of a finely divided interpolyamide prepared by the copolymerization of 6 parts of hexamethylene diammonium adipate and 4 parts of caprolactam, the polymer having an intrinsic viscosity of 1.0. Five coats of the suspension are applied on each side of the muslin. The dry weight of coating realized by this method is approximately 3.5 ounces per 38" yard. The interliner thus prepared is fused between plies of broadcloth, moistening the broadcloth with water, and pressing at 320° F. for 5–10 seconds. The laminated fabric prepared in this way is fabricated into a semi-stiff collar, offering no difficulties in the sewing and cutting steps, and giving a final product which is of an appropriate degree of stiffness.

Example IV

Woven polyhexamethylene adipamide fabric was fused between outer plies of white broadcloth by pressing with a heated electric plate. The product was well anchored and very resistant to laundering treatments.

Example V

A sheet 0.014" thick of polyamide prepared by the polymerization of caprolactam was fused between outer plies of white broadcloth by pressing between plates at 198° C. for 60 seconds under a pressure of 8000 lbs./sq. in. The product showed good anchorage and stiffness, and the anchorage was not destroyed by soaking a sample of the product in water at room temperature for one week.

Example VI

Cotton muslin fabric was passed through a solution at 48 C. of 15 parts of an interpolyamide derived by the interpolymerization of 6 parts of hexamethylene diammonium adipate and 4 parts of caprolactam in 85 parts of a solvent mixture consisting of 2 volumes of chloroform, 2 volumes of methanol, and 1 volume of n-butanol. Excess solution was allowed to drain from the fabric, which was then air dried. This treatment gave a coating of 76 parts of polymer on every 100 parts of fabric. The coated fabric was then fused between outer layers of white broadcloth by pressing under a hot plate, after moistening the interlayer with n-butanol. The product had the pliability desired in a semi-stiff collar.

Example VII

A fabric woven from 120 denier, 30 filament yarn prepared from an ester-amide interpolymer derived from 30 parts of hexamethylene diammonium sebacate and 70 parts of pentaglycol sebacic acid mixture was fused at 125° C. and 6000 lbs./sq. in. pressure for 30 seconds between two outer plies of broadcloth. The product had an anchorage and pliability which were appropriate for use in permanently stiff collars, cuffs, etc. The anchorage was not destroyed by soaking in water at room temperature for 24 hours.

Example VIII

A fabric woven from staple containing 35% polyhexamethylene adipamide fibers and 65% of viscose rayon fibers was fused between outer plies of broadcloth at 235° C. and 7000 lbs./sq. in. pressure for 30 seconds. The product had an anchorage and pliability appropriate for permanently stiffened collars.

The laminated cloth products of this invention can be prepared in a number of ways. Preformed films of polymer or polymer in comminuted form may be used as an interliner between outer laminae of the cloth and anchorage achieved by pressing together at a temperature close to the softening point of the polyamide. Adhesion may be obtained at lower temperatures by conducting the pressing step in the presence of small amounts of a volatile material which is a solvent or swelling agent for the polyamide.

In another method there is utilized as an interliner a porous structure, such as cloth which has been impregnated or coated with polymer. Such impregnation or coating may be obtained by dipping the cloth in molten polymer or in a solution of polymer in a volatile solvent, or in a suspension of finely divided polymer in a volatile liquid, or by spreading or spraying such solutions, suspensions, or melts on the cloth. Impregnation may also be obtained by pressing a sheet of one of the cloth laminae against a film of polymer at a temperature such that the polymer film is melted and flows into and impregnates the cloth. These methods are often of especial commercial value, since only a relatively small amount of polymer is generally sufficient to obtain very good anchorage. Penetration of the polymer solution into the fabric may occasionally be accelerated by pre-wetting the fabric with the solvent or vehicle. There may also be used as an interliner a fabric woven wholly or in part from polymer which has been prepared in filament form and, if desired, has been oriented by the application of stress. Porous films of polymer may also be used as an interliner.

Suitable bonds may also be achieved by coating one or both of the cloth surfaces which are to be adhesively joined with a solution of the polymer in a volatile solvent, allowing the major portion of the solvent to evaporate, and then bringing the surfaces in contact and removing the last traces of solvent, preferably by heating. It is sometimes advantageous to apply the polymer from solution, after which the temperature is raised to drive off all solvents and to fuse the polymer before the outer laminae are brought in contact to make the bond.

In addition to the polyamides, which are preferred because they present the most desirable combination of properties for the present purpose, other types of the synthetic linear fiber-forming polymers are applicable in the present invention. These polymers include polyesters, polyanhydrides, polyacetals, polyethers, polyester-polyamides, and other linear polymers, interpolymers, and copolymers in which the functional group (linking group) is an integral part of the chain of linear atoms. As indicated in U. S. Patent 2,071,250 these polymers are microcrystalline.

The polyamides, as previously indicated, may be obtained by reaction of a diamine with an equimolecular amount of dibasic acid, or from polymerizable amino acids, preferably of the type R—NH—R'—COOH where R' is a divalent organic radical having a chain of at least 5 atoms and R is a univalent organic radical or hydrogen. Interpolymers derived from mixtures of the above ingredients are also especially valuable, a particularly useful subclass being those interpolymers derived by interpolymerization of an equimolecular mixture of a straight chain diamine and a straight chain dibasic acid, which mixture also contains any desired amount of a polymerizable amino acid or derivative thereof. As diamines suitable for use may be mentioned tetra-, penta-, hexa-, octa-, and deca-methylene-diamines, as well as substituted derivatives such as diaminoisopropanol. Examples of suitable dibasic acids are malonic, glutaric, adipic, pimelic, suberic, sebacic and diphenic acids and their substituted derivatives, such as methyl adipic acid. Also operable are amide-forming derivatives of these acids, such as esters, halides, nitriles, amides, and anhydrides. Furthermore, as polyamide-forming ingredients, either alone or in admixture with the above mentioned diamines and dibasic acids, there may be used polymerizable amino acids such as 6-aminocaproic acid, 7- aminoheptoic acid, 9-aminononoic acid, 11-aminoundecanoic acid, 17-aminoheptadecanoic acid, 8-aminocaprylic acid, and amide-forming derivatives of such acids, such as the esters, halides, nitriles, amides, anhydrides and lactams.

The solvents and softening agents useful in the application of the polymers to the cloth include mentioned phenols, cresols, water, organic and inorganic acids, saturated and unsaturated alcohols, and mixtures of such alcohols with water or with chlorinated hydrocarbons.

Pressures ranging from 100 to 10,000 lbs./sq. in. and temperatures of 100°–200° C. are suitable for the preparation of the stiffened fabrics described herein. In general temperatures of 10 to 50° C. below the melting point of the polymer are best.

The film or interlayer used in the preparation of the laminated articles of this invention need not necessarily consist solely of polymer. It is within the scope of the invention to use softening or plasticizing agents in conjunction with the polyamides. Suitable plasticizers for this purpose are o-hydroxydiphenyl, diphenylolpropane, aryl sulfonamides, alkylarylsulfonamides, aliphatic esters and diesters, or mixtures thereof. The use of such plasticizers is sometimes desirable, since their presence generally results in a polymer composition of improved adhesive properties. If a plasticizer is to be used, it is frequently advantageous to prepare the polyamide in the presence of a plasticizer. Plasticizers may also be added to solutions of the polymer, or films of the polymer may be soaked in the plasticizer before placing between the laminae. If desired, other materials may be added to the polymer or to the solution containing the polymer. Such materials include pigments, extenders, fillers, resins, dyes, and cellulose derivatives. Wetting agents may be added to the solutions to aid penetration.

In the preparation of stiff fabrics, especially in permanently stiff collars, the invention yields a product of markedly improved durability. They do not, as do collars stiffened with cellulose acetate, lose their stiffness and resiliency during use, due to degration of the bonding agent by laundering and other treatments. The products of this invention are stable to laundering treatments, perspiration, etc. The laminated products described herein exhibit greatly improved anchorage, and properly prepared stiffened fabrics cannot be separated from the interlayer without tearing the outer layers, even after repeated laundering, while most commercial products are readily separated from the interliner even when dry.

A particularly valuable advantage of my improved wearing apparel arises from the fact that it is possible through the use of particular polyamides, namely, interpolyamides to obtain a product of appropriate stiffness without the use of a plasticizer. The importance of this fact will be apparent from the defects inherent in the collars previously used which are stiffened with plasticized resinous compositions. These compositions change in properties during use, due to evaporation or washing out of the plasticizer and/or to degradation of the resin. This plasticizer loss results in undue stiffening which often causes the resinous interlayer to actually cut through the outer plies at points of stress.

In this invention changes in stiffness due to plasticizer loss are eliminated.

As many apparently widely different embodiments of this invention may be made without departing from the spirit and scope thereof, it is to be understood that I do not limit myself to the specific embodiments thereof except as defined in the appended claim.

I claim:

An article of apparel of the class consisting of collars, cuffs, and the like which comprises at least two cloth laminae bonded by means of an interlayer of high molecular weight interpolymer consisting essentially of the interpolymerization product of hexamethylene diammonium adipate and a substance of the class consisting of omega-aminocaproic acid and its amide-forming derivatives.

FRANKLIN TRAVISS PETERS.

CERTIFICATE OF CORRECTION.

Patent No. 2,268,616.  January 6, 1942.

FRANKLIN TRAVISS PETERS.

It is hereby certified that error appears in the printed specification of the above numbered patent requiring correction as follows: Page 1, first column, line 52, for "2,9071,253" read --2,071,253--; page 4, first column, line 12, for "degration" read --degradation--; and that the said Letters Patent should be read with this correction therein that the same may conform to the record of the case in the Patent Office.

Signed and sealed this 17th day of February, A. D. 1942.

(Seal)

Henry Van Arsdale,
Acting Commissioner of Patents.